(12) United States Patent
Muderlak et al.

(10) Patent No.: US 9,464,421 B2
(45) Date of Patent: Oct. 11, 2016

(54) HANDLE LOCK ASSEMBLY FOR FLUSH VALVE SYSTEM

(71) Applicant: Xela Innovations, LLC, Glendale, WI (US)

(72) Inventors: Todd J. Muderlak, Whitefish Bay, WI (US); Kenneth J. Muderlak, Milwaukee, WI (US)

(73) Assignee: XELA INNOVATIONS, LLC, Glendale, WI (US)

( * ) Notice: Subject to any disclaimer, the term of this patent is extended or adjusted under 35 U.S.C. 154(b) by 508 days.

(21) Appl. No.: 13/838,976

(22) Filed: Mar. 15, 2013

(65) Prior Publication Data

US 2014/0259347 A1 Sep. 18, 2014

(51) Int. Cl.
*E03D 13/00* (2006.01)
*E03D 5/02* (2006.01)
*F16K 35/06* (2006.01)

(52) U.S. Cl.
CPC ............... *E03D 5/026* (2013.01); *F16K 35/06* (2013.01)

(58) Field of Classification Search
CPC ........... E03D 5/02; E03D 5/026; E03D 5/09; E03D 5/092; E03D 5/094; F16K 35/00; F16K 35/06; F16K 35/08; F16K 35/10
USPC .............. 70/175–180, 18, 20, 201–203, 208, 70/209, 211, 212, 215, 232; 137/383, 137/384.2, 385; 251/40, 90–93, 101, 107; 292/1, 256.6, 288, 299, 307 B, 336.3; 4/249, 300–305, 405, 415, 422, 661
See application file for complete search history.

(56) References Cited

U.S. PATENT DOCUMENTS

| | | | |
|---|---|---|---|
| 4,134,570 A * | 1/1979 | Walker | 251/40 |
| 4,210,309 A | 7/1980 | Grenier | |
| 4,272,052 A | 6/1981 | Gidner | |
| 4,868,931 A * | 9/1989 | Schneeweiss | 4/308 |
| 5,024,303 A * | 6/1991 | Kosloff | 188/300 |
| 5,033,280 A * | 7/1991 | Johnson | 70/232 |
| 5,359,866 A * | 11/1994 | Boddy | 70/18 |
| 5,394,715 A * | 3/1995 | Guerette | 70/177 |
| 5,604,937 A | 2/1997 | Davenport | |
| 5,711,037 A | 1/1998 | Reichardt et al. | |
| 5,806,555 A * | 9/1998 | Magno, Jr. | 137/385 |
| 6,089,054 A | 7/2000 | Stukas et al. | |
| 6,286,153 B1 | 9/2001 | Keller | |
| 6,698,035 B1 | 3/2004 | Grueser | |
| 6,701,541 B2 | 3/2004 | Romagna et al. | |
| 6,959,723 B2 | 11/2005 | Gorges | |
| 7,246,386 B2 | 7/2007 | Hall | |

(Continued)

*Primary Examiner* — Paul R Durand
*Assistant Examiner* — Nicholas Ros
(74) *Attorney, Agent, or Firm* — Husch Blackwell LLP

(57) ABSTRACT

The disclosure provides a lock assembly to lock a flush valve system, the handle lock assembly configured for placement on a flushing valve handle of a urinal or toilet comprising a top component and a bottom component comprising first and second arm sections and a center support section situated there between, each arm section pivotally connected to the first end of the top component. The arm sections also comprise a locking element for releasably locking with a mating locking element on the top component. A major advantage of the methods, systems and apparatuses disclosed herein is the savings in water that can be achieved without having to replace the current water-based urinal with a no-water urinal or expensive urinal with automatic flushing devices that control flushing.

16 Claims, 14 Drawing Sheets

(56) References Cited

U.S. PATENT DOCUMENTS

| | | |
|---|---|---|
| 7,571,741 B2 | 8/2009 | Higgins |
| 7,636,957 B2 | 12/2009 | Funari |
| 7,900,288 B2 | 3/2011 | Fima |
| 8,231,865 B2 | 7/2012 | Pliszka |
| 8,234,723 B2 | 8/2012 | Allen |
| 8,291,522 B2 | 10/2012 | Kueng |
| 8,322,682 B2 | 12/2012 | Maercovich |
| 2012/0117719 A1 | 5/2012 | Brooks |
| 2012/0317707 A1 | 12/2012 | Romero |
| 2013/0031708 A1 | 2/2013 | Sensel |
| 2013/0199252 A1* | 8/2013 | Harder .............................. 70/57 |

\* cited by examiner

HANDLE LOCK ASSEMBLY FOR FLUSH VALVE SYSTEM

FIELD

Embodiments of this disclosure relate to plumbing fixtures and more particularly to a flush valve handle. In one embodiment, the disclosure relates to lock for a flush valve handle system. In one embodiment, a handle lock assembly for the flush valve system can help reduce water usage.

BACKGROUND

Water conservation is a major concern in many areas and is likely to become even more important in the future as populations increase resulting in more water consumption. Practicing water conversation on a regular basis has many benefits including saving money both in the short term and long term. In the short term, water conservation saves the consumer money by reducing a consumer's monthly water utility bill. In the long term, consumers save money by postponing, or even preventing, the building of new water supply infrastructures, thereby reducing the per unit cost (or slowing the increase in cost) of water. In addition, those in charge of water utilities have become increasing militant in the way they promulgate rules regulating water usage and imposing fines for violation thereof. The bathroom is one area where water is often needlessly used.

The largest daily user of water in the commercial establishments is the urinal and in homes is the toilet. The average urinal uses over 40,000 gallons of water per year! To further conserve water use, low water use urinals and no-water urinals have been devised. These no-water urinals are not flushed with water each time a person uses the urinal and, in fact, they are not equipped for flushing as they are not connected to a water supply. As the no-water urinal is repeatedly used, most urine is collected in a compartment of the urinal. An oily sealing liquid (some organic oils) that is immiscible with the urine and is lighter than the urine covers the collected urine. This oily sealing liquid floats on the surface of the urine, serving as a barrier that prevents odors from the urinal from escaping to the environment. Typically, such no-water urinals include a removable cartridge having a top with an opening in communication with the compartment holding an initial water charge that mixes with urine flowing into the compartment through the opening. A stand pipe type drain is in communication with the compartment that allows the compartment to be drained continually to a sewer or other waste disposal system as the compartment is filled with urine. Dry traps using mechanical valves or small p-traps are also used to prevent odor from escaped while still allowing urine and fluids to pass.

A disadvantage of these no-water urinals is that the urinals are specially designed to accept these removable cartridges. For an institution to convert from water-based urinals to no-water urinals requires the complete replacement of the existing water-based urinals. This can be an expensive and time-consuming process.

Therefore, a device or system is needed for those installed urinals and other fixtures that can conserve water in significant amounts.

SUMMARY

Embodiments of the disclosure relate to a lock assembly. In one embodiment, the disclosure relates to a handle lock assembly. In yet another embodiment, the disclosure relates to a handle lock assembly for a flush valve system.

In one embodiment, the disclosure relates to a handle lock assembly configured for placement on a flushing valve handle of a urinal or toilet comprising: (a) a top component having an arcuate inner surface and first and second ends; (b) a bottom component comprising first and second arm sections and a center support section situated there between, each of said sections having an arcuate inner surface and first and second ends, wherein each of the first ends being pivotally connected to the first end of the top component. The second end of the center support section is rigidly connected to the second end of the top component. Each of the second ends of the arm sections comprise a locking element for releasably locking with a mating locking element on the second end of the top component.

In yet another embodiment, the disclosure relates to a handle lock assembly configured for placement on a handle of a urinal comprising: (a) a top component having an arcuate inner surface and first and second ends, the second end having two spaced apart apertures, each aperture configured for releasably engaging a lock spring therein; and (b) a bottom component comprising first and second arm sections and a center support section situated there between, each of said sections having an arcuate inner surface and first and second ends, wherein each of the first ends being pivotally affixed to the first end of the top component. The second end of the center support section is rigidly affixed to the second end of the top component. Each of the second ends of the arm sections comprise a lock spring configured for insertion into and releasable engagement within one of the apertures in the top component.

In another embodiment, a kit is provided having a handle lock assembly and instructions. The handle lock assembly has all the components to secure the handle lock to any type of handle and any size of handle that is on either the right or the left side of the flush valve. The handle block assembly includes screws, a releasable key, and a top and bottom component. The handle lock assembly can be provided in a fully-assembled, partially assembled or unassembled format. The bottom component may be provided as one assembled piece or in distinct pieces. The instructions instruct the user to place the handle block assembly on a handle of a right or left handle installation. The instructions provide the user all necessary information so that the handle lock assembly can function.

In a further embodiment of the present invention, a method of conserving water using a handle lock assembly for a flush valve system is provided. The method includes obtaining a handle lock assembly, and placing the handle lock assembly on a handle of a flush valve system.

An advantage of the methods, systems and apparatuses disclosed herein is that the lock assembly can be installed without having to remove anything or having to turn off the water to the urinal or toilet.

An advantage of the methods, systems and apparatuses disclosed herein is that the lock assembly can be installed on a left or right handle installation.

An advantage of the methods, systems and apparatuses disclosed herein is that the lock assembly is easy to release with the appropriate key and easy to re-lock the system after flushing with no key.

An advantage of the methods, systems and apparatuses disclosed herein is that the lock assembly can prevent the accidental, incidental or over-flushing of a urinal or toilet with an automatic flushing device.

A major advantage of the methods, systems and apparatuses disclosed herein is the savings in water that can be achieved without having to replace the current water-based urinal with a no-water urinal or expensive urinal with automatic flushing devices that control flushing. Each urinal or toilet using the apparatus and methods disclosed herein will reduce the amount of water used by the urinals. In addition, a lower charge for sewerage fees will also occur.

BRIEF DESCRIPTION OF THE DRAWINGS

Preferred embodiments of the disclosure are described below with reference to the following accompanying drawings, which are for illustrative purposes only. Throughout the following views, the reference numerals will be used in the drawings, and the same reference numerals will be used throughout the several views and in the description to indicate the same or like parts.

DETAILED DESCRIPTION

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible.

The term "urinal," as used herein, refers to a receptacle used for urinating.

The term "flush," as used herein, refers to a rinse of water.

The term "valve," as used herein, refers to any structure, mechanism or device configured to control the flow of a fluid.

The term "lockable," as used herein, refers to a structure capable of being locked.

The term "toilet," as used herein, refers to a seat toilet and a squat toilet.

The term "urinal," as used herein, refers to a receptacle for the urination. The term "urinal" includes but is not limited to a floor urinal and pedestal urinal.

The description and figures disclose a handle lock assembly for a flush valve handle. The handle lock assembly thereby allows selective operation of the flush valve between a manually-operable flushable state and a locked non-flushable state.

Embodiments of the disclosure relate to a lock assembly. In one embodiment, the lock assembly is installed on a handle. In another embodiment, the lock assembly is for a flush valve system. In still another embodiment, the lock assembly is installed on the handle of a urinal or a toilet.

In one embodiment, the handle lock assembly can be installed on any type and size of handle. In another embodiment, the handle lock assembly can be installed on a left or right handle installation. In yet another embodiment, the handle lock assembly can be mounted on an already installed urinal or toile valve handle.

Figure 1:
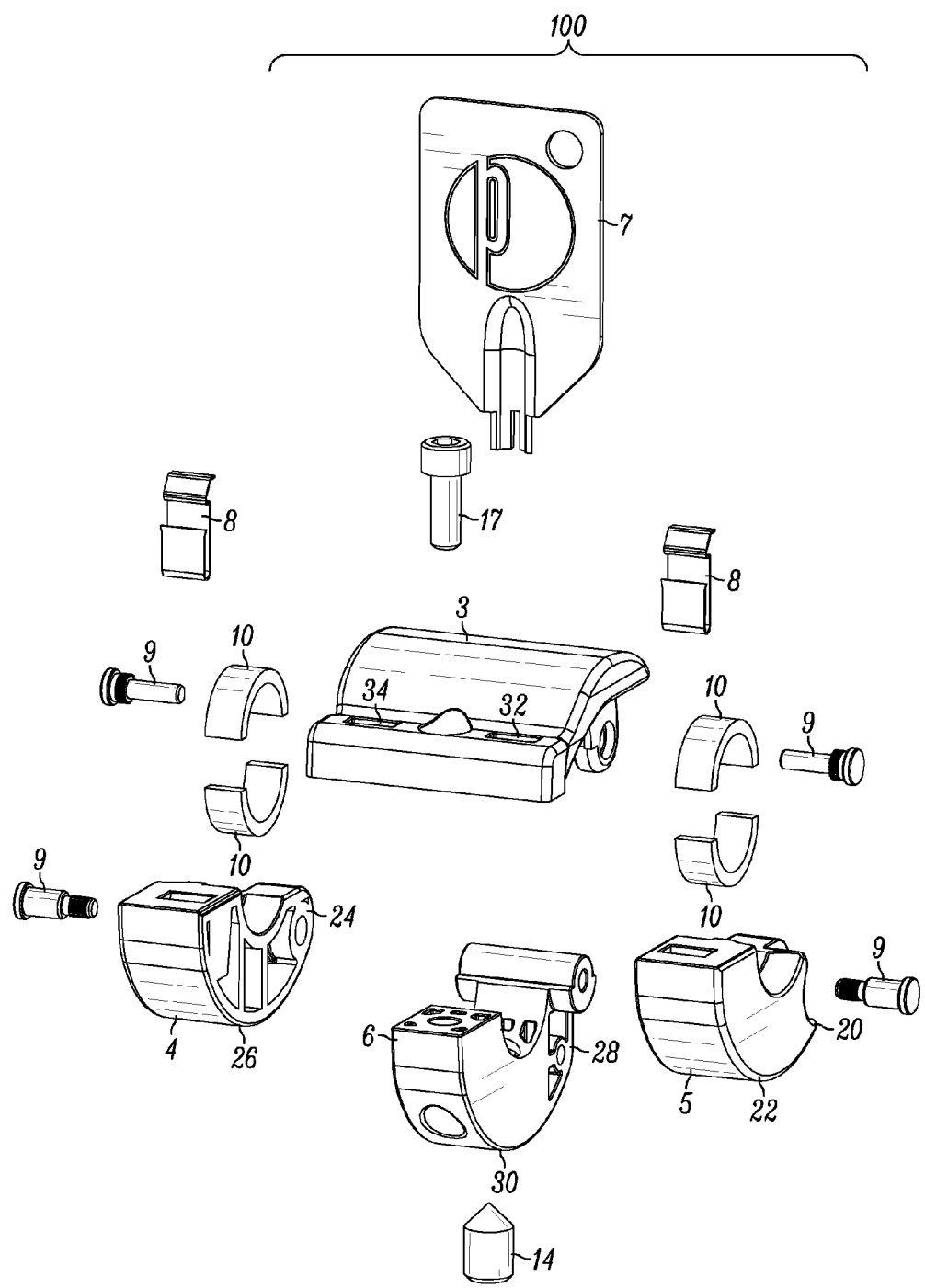
FIG. 1 is a front view of a disassembled handle lock assembly with associated parts.

An embodiment of a handle lock assembly 10 according to the disclosure is described with reference to FIGS. 1-14. Referring to FIG. 1, an exploded view of the handle lock assembly 10 is provided. The handle lock assembly 100 comprises a top component 3 having an arcuate inner surface and first and second ends. The handle lock assembly 100 also comprises a bottom component comprising first 4 and second arm 5 sections and a center support section 6 situated between the first 4 and second 5 arm sections. The first 4 and second 5 arm sections, as well as the center support section 6 of the bottom component each have an arcuate inner surface and first 20, 24, and 28 and second ends 22, 26, and 30.

The first ends of the first 4 and second 5 arm sections, and the center support section 6 are pivotally connected to the first end of the top component 3. The first 4 and second 5 arm sections comprise a hinge of the release arm 9 so that the arms can rotate about the hinge (as shown in a downward direction) to create a clearance when a flush is desired.

Each of the second ends of the first 4 and second 5 arm sections have a locking element 8 for releasably locking with a mating locking element on the second end of the top component 3. A lock spring 8 holds the first 4 and second 5 arm sections locked in place.

The second end of the center support section 6 is rigidly connected to the second end of the top component 3. A set screw 14 can be used to tightly mount the handle lock to the handle. A screw 17 can be used to tighten the top component 3 to the center support section 6.

The top component 3 contains a receiving slot or aperture 32, 34 for a release key 7 for flushing. The release key 7 is inserted into the receiving slot or aperture of the top component 3, and pushes in the lock spring 8, thereby causing the first 4 or second 5 arm sections to rotate down and create a clearance so a flush can be achieved.

The handle lock assembly can be installed on any handle of any size. Rubber shims 10 are used to ensure the handle lock assembly is securely affixed to the handle. The number of rubber shims 10 used depends on the thickness of the handle. For example, a thinner handle will likely require more rubber shims 10 to ensure a secure fit to the handle.

The handle lock assembly can be made from any material known in the art, including, but not limited, plastic, metal and combinations thereof. In further embodiments, the handle lock assembly may be treated, such as with an antibacterial/antimicrobial coating, to protect the handle lock assembly.

Figure 2:
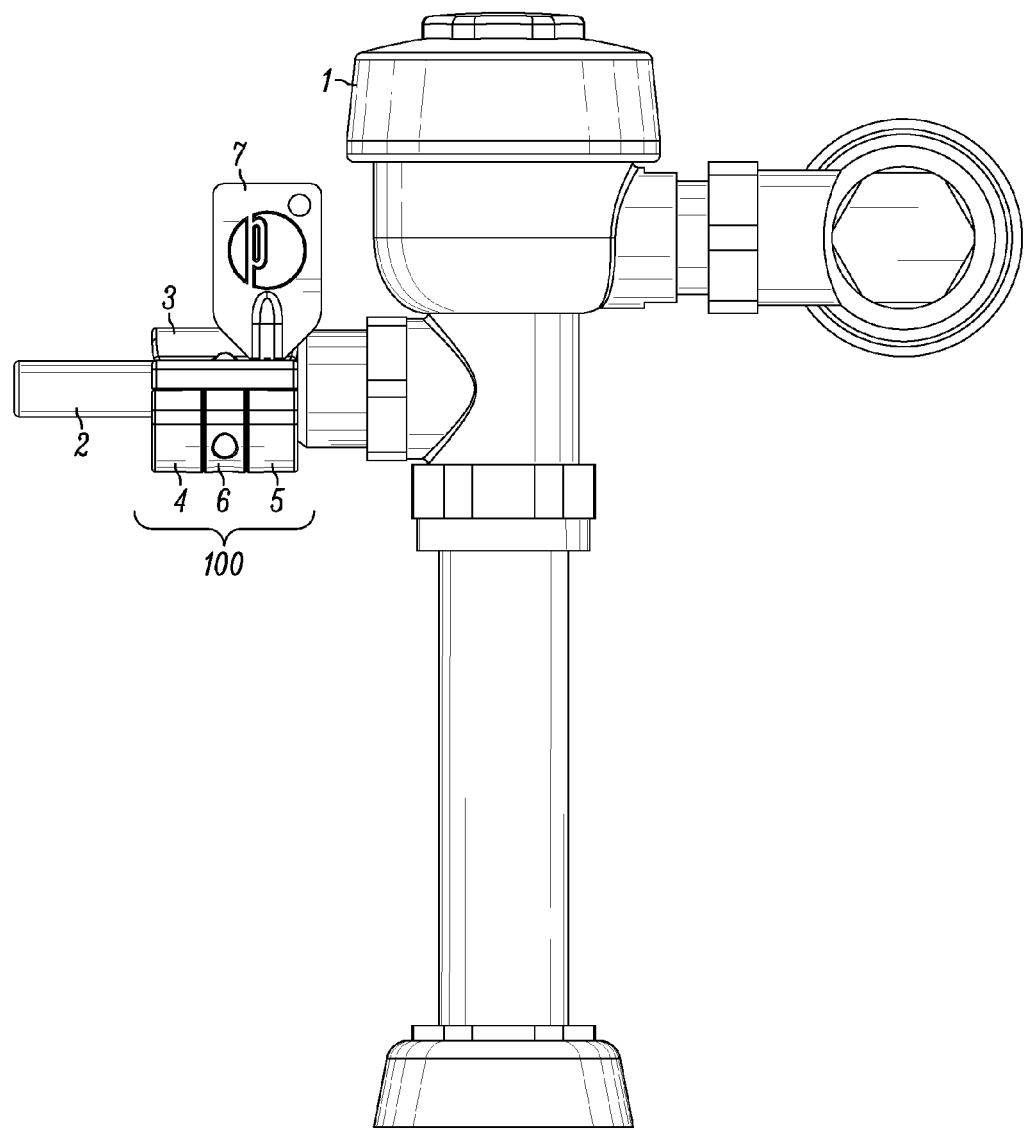
FIG. 2 is a front view of an assembled handle lock assembly on a left hand installation.

FIG. 2 depicts a representative example of a handle lock assembly 100 on a left handle 2 installation. The handle lock assembly is used to lock the flush valve 1 on this particular flush valve system. The handle lock assembly slides over the handle and when locked prevents flushing.

As shown in FIG. 2, the first 4 and second 5 arm sections are separated by the center support 6. The center support section 6 secures the handle assembly 100 to the handle 2. The release key 7 is inserted into a receiving slot in the top component 3 of the handle assembly.

Figure 3:
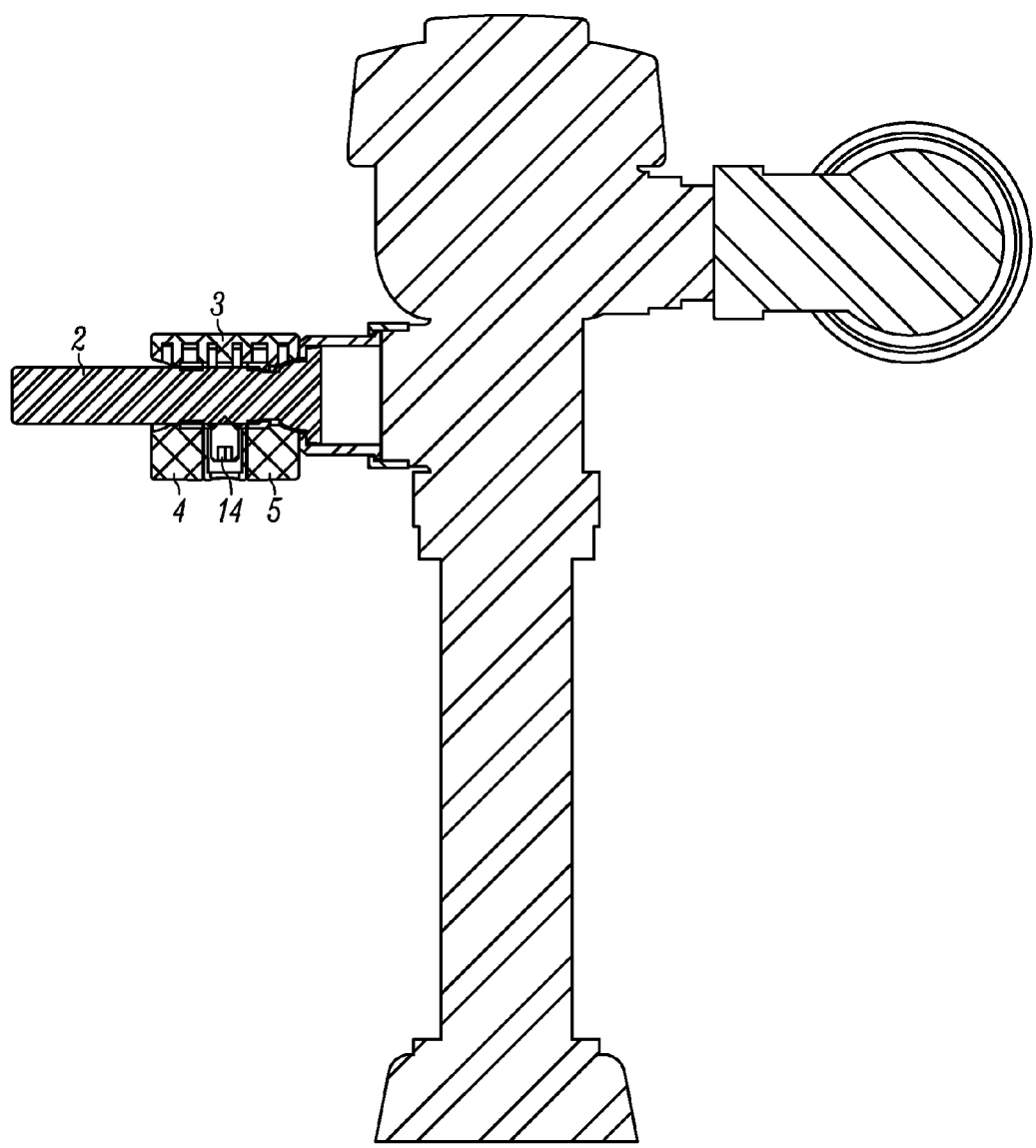
FIG. 3 is a cross-sectional view of FIG. 2.
Figure 4:
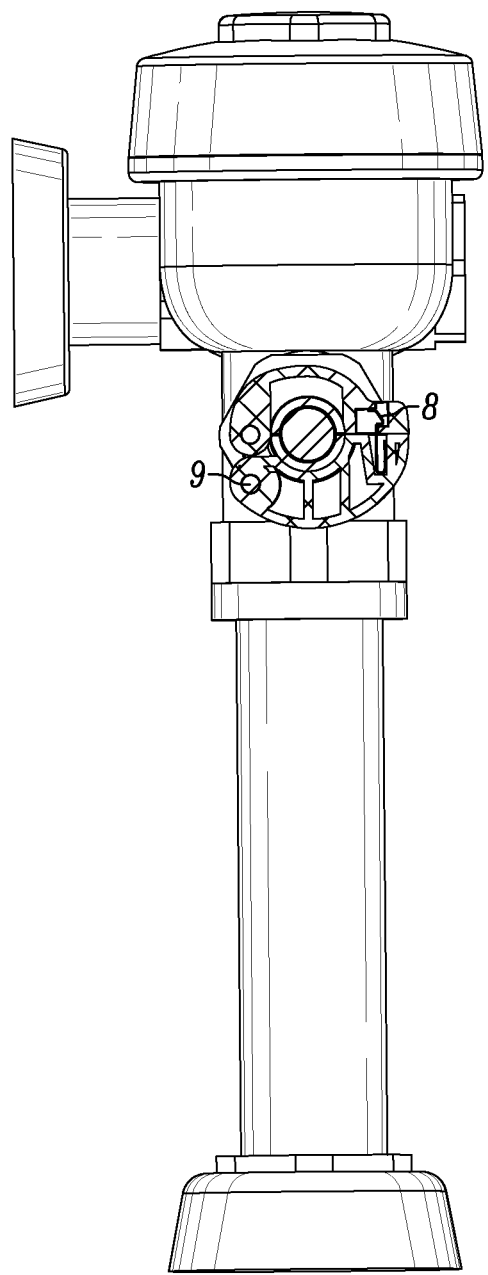
FIG. 4 is a cross-sectional view of a handle lock assembly on a handle depicting the lock spring and the hinge release arm of the first and second arm sections.
Figure 5:
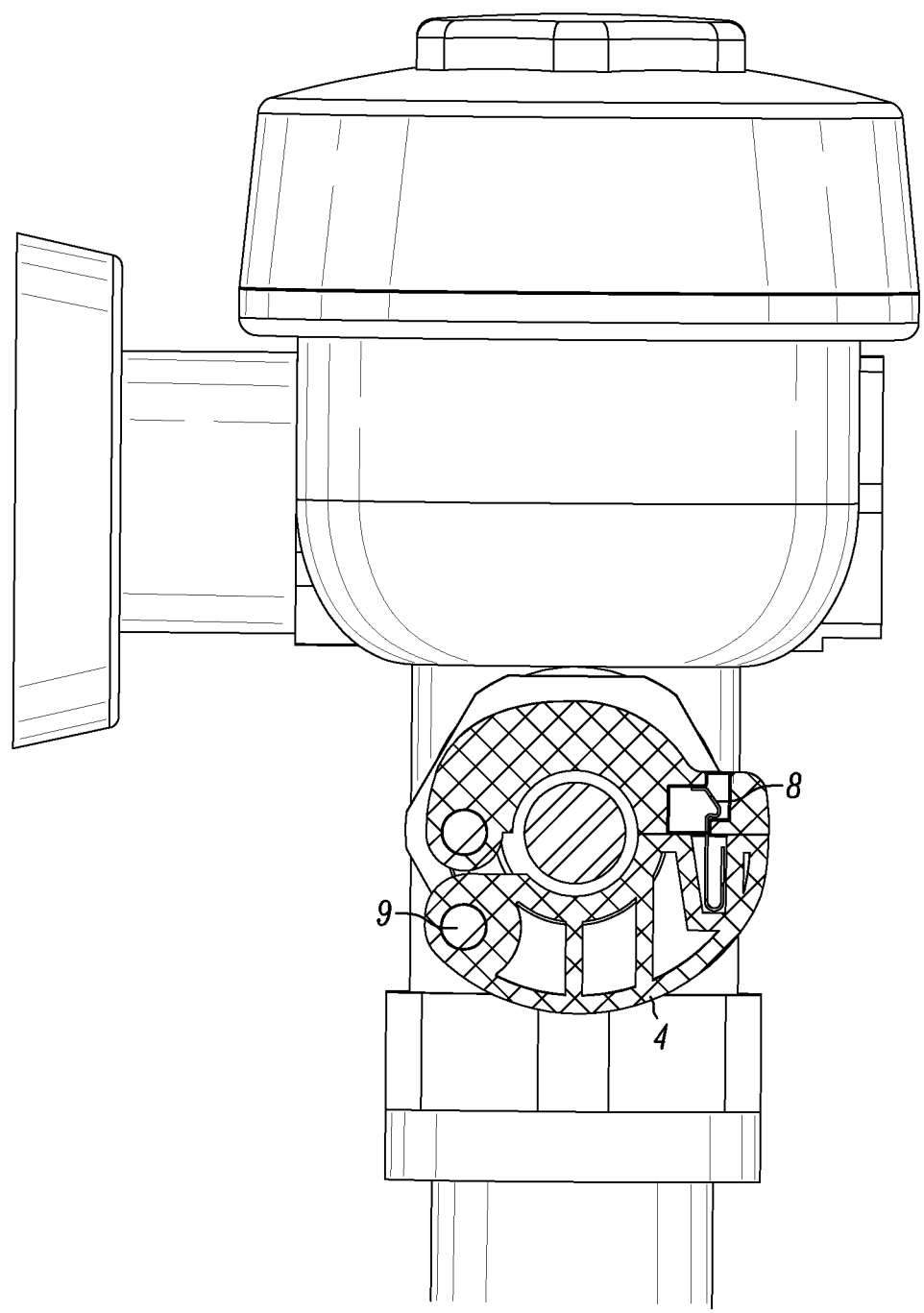
FIG. 5 is an exploded view of the FIG. 4.

FIG. 3 provides a partial cross-sectional view of FIG. 2. As can be seen, a set screw 14 is used to secure the handle lock assembly 100 to the left handle 2. More specifically, the set screw 14 is positioned to pass through and engage the handle 2 and engage the top component 3. The first 4 and second 5 arm sections can be seen in cross-section, again separated by the center support section 6. FIGS. 4-5 provide a partial cross section view showing the lock spring 8, which holds the first 4 and second 5 arm sections in place. Each of the first 4 and second 5 arm sections have a hinge 9 that allows the arms to rotate down so that clearance can be created when a flush is desired.

Figure 6:
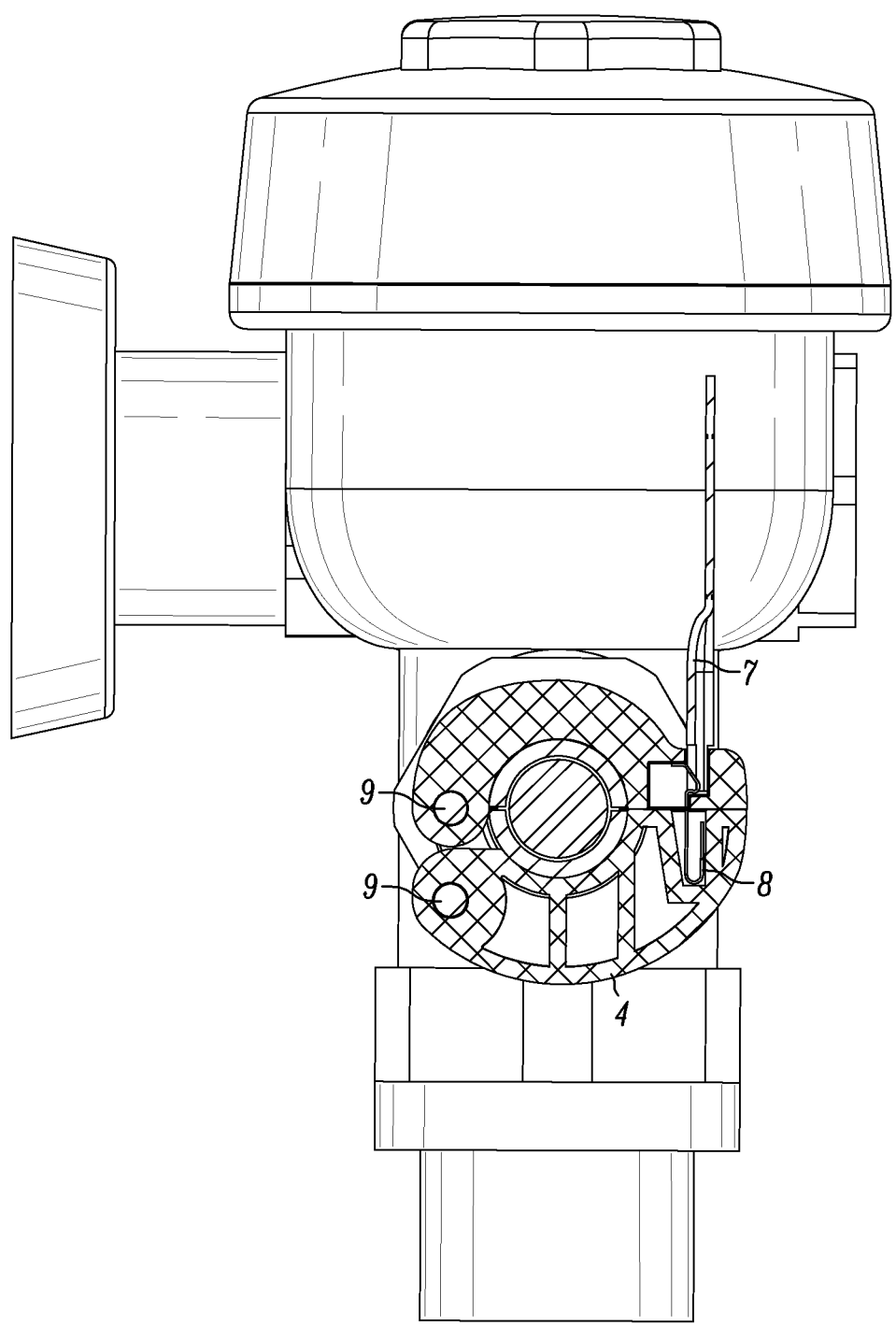
FIG. 6 is an exploded view of FIG. 4.

FIG. 6 provides a partial cross sectional view showing the release key 7 inserted into the receiving slot on the top component 3. When the key 7 is inserted, the key 7 pushed the leaf spring 8, which releases the first 4 and second 5 arm sections and unlocks the handle 2.

Figure 7:
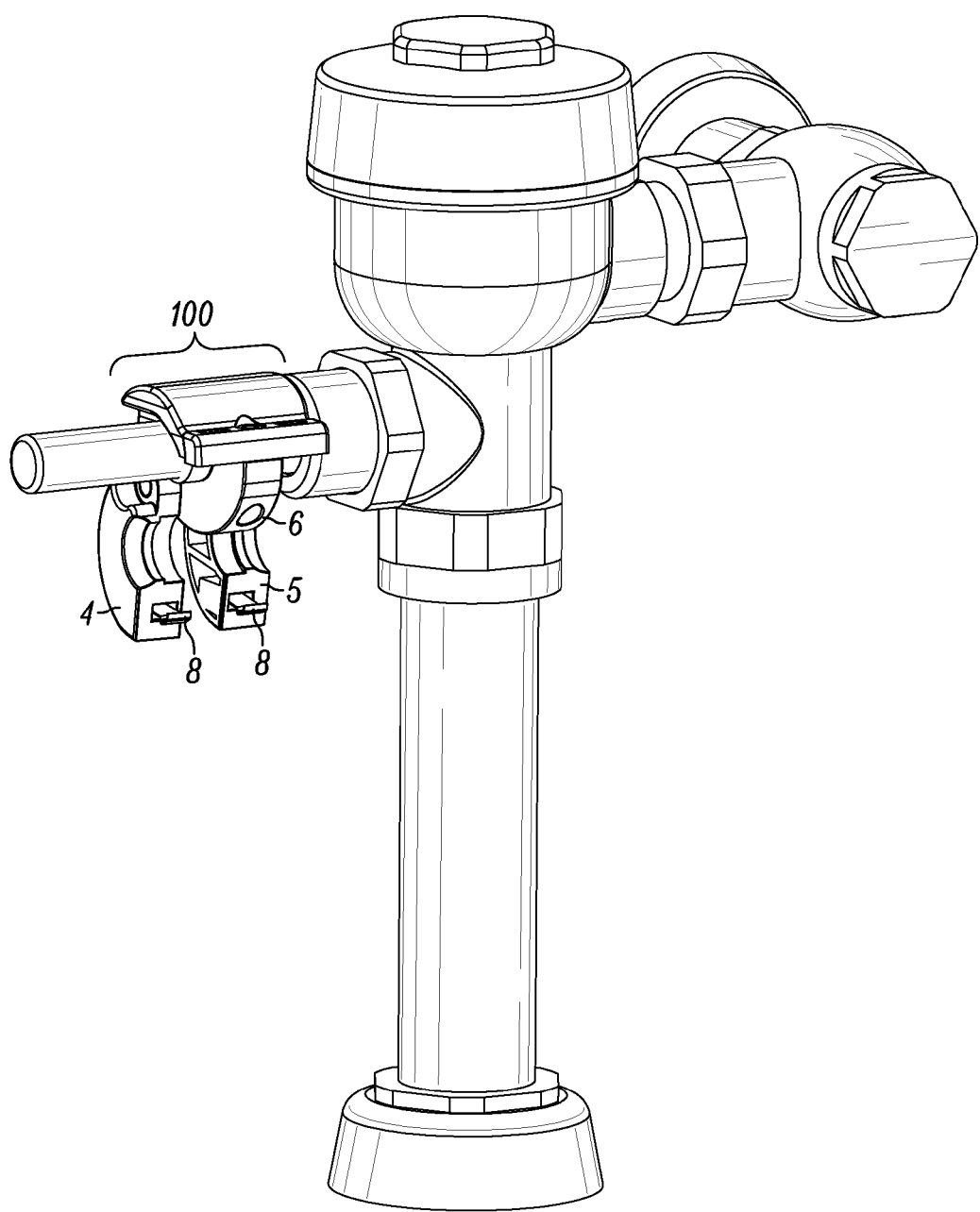
FIG. 7 is a front view of a handle lock assembly secured to a left handle installation with the first and second arm sections in the open position.

Turning now to FIG. 7, the handle lock assembly 100 is secured to the handle 2 through the center support section 6. FIG. 7 shows the handle lock assembly 100 with the first 4 and second 5 arm sections in the open position. The lock spring 8 can be seen with both the first 4 and second 5 arm sections. When the first 4 and second 5 arm sections engage with the top component 3, the lock spring 8 will engage with a mating locking element 32, 34 on the top component 3, which will secure first 4 and second 5 arm sections into a locked configuration.

Figure 8:
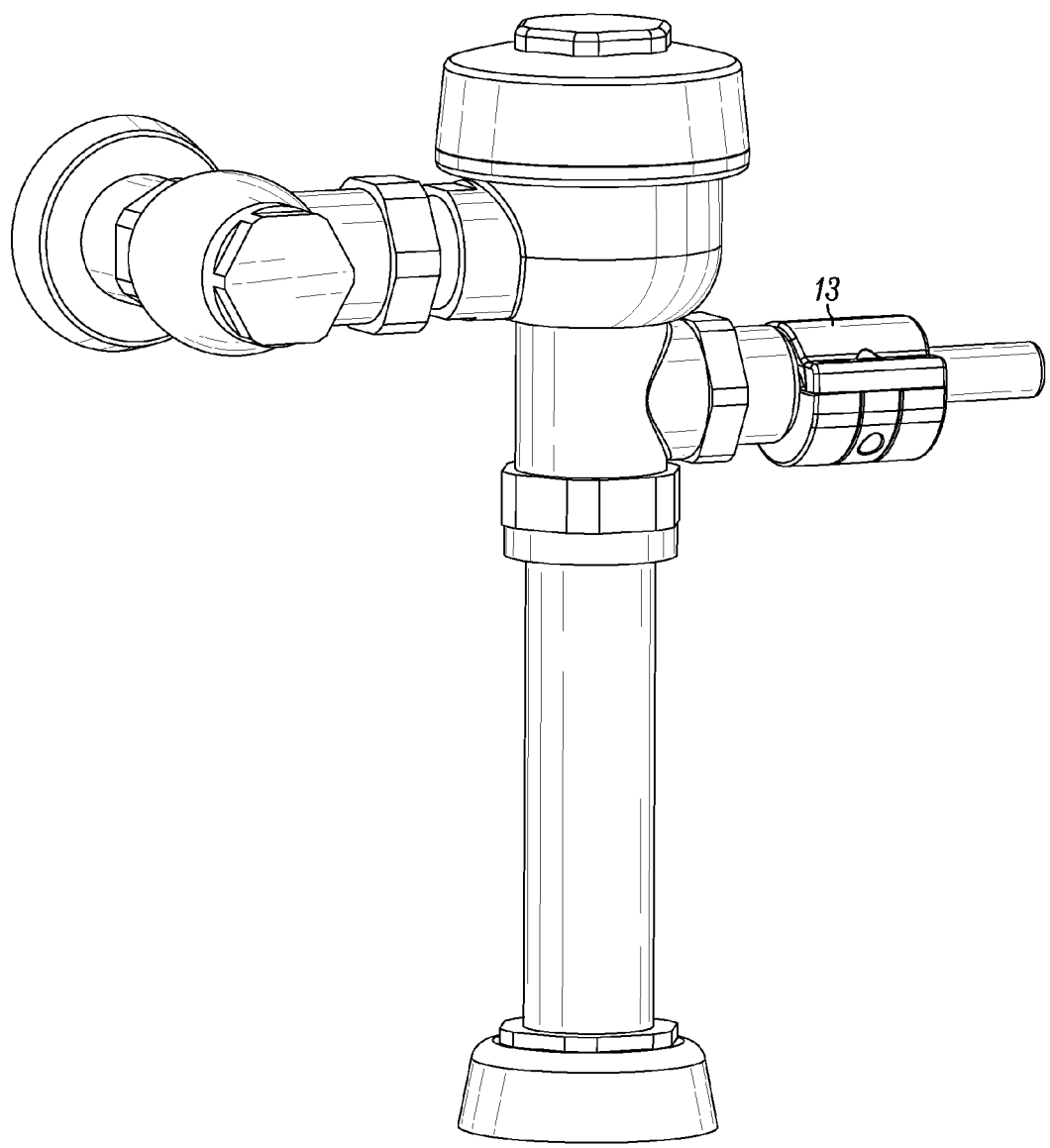
FIG. 8 is a front view of a handle lock assembly secured to a right handle installation with the first and second arm sections in the closed position.

FIG. 8 is a representative schematic of a handle lock assembly 100 on a right handle 13 installation. The first 4 and second 5 arm sections are in locked configuration, which will prevent the handle from flushing. The handle lock assembly 100 easily adapts to either a left 2 or right handle 13 installation, providing universal applicability and versatility.

Figure 9:
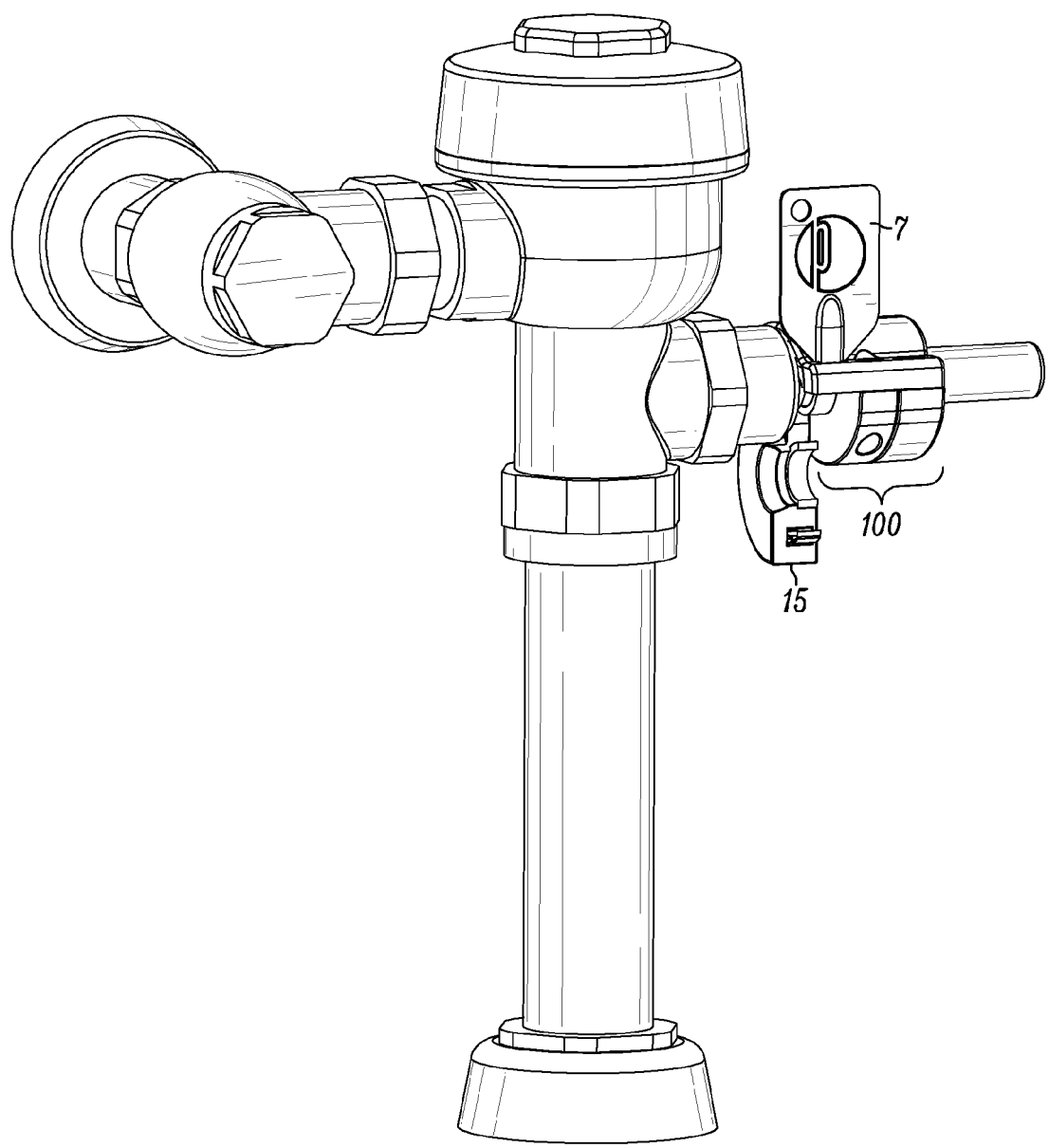
FIG. 9 is a front view of a handle lock assembly secured to a right handle installation with the release key inserted into the receiving slot or aperture in the top component and the first arm section in the open position.
Figure 10:
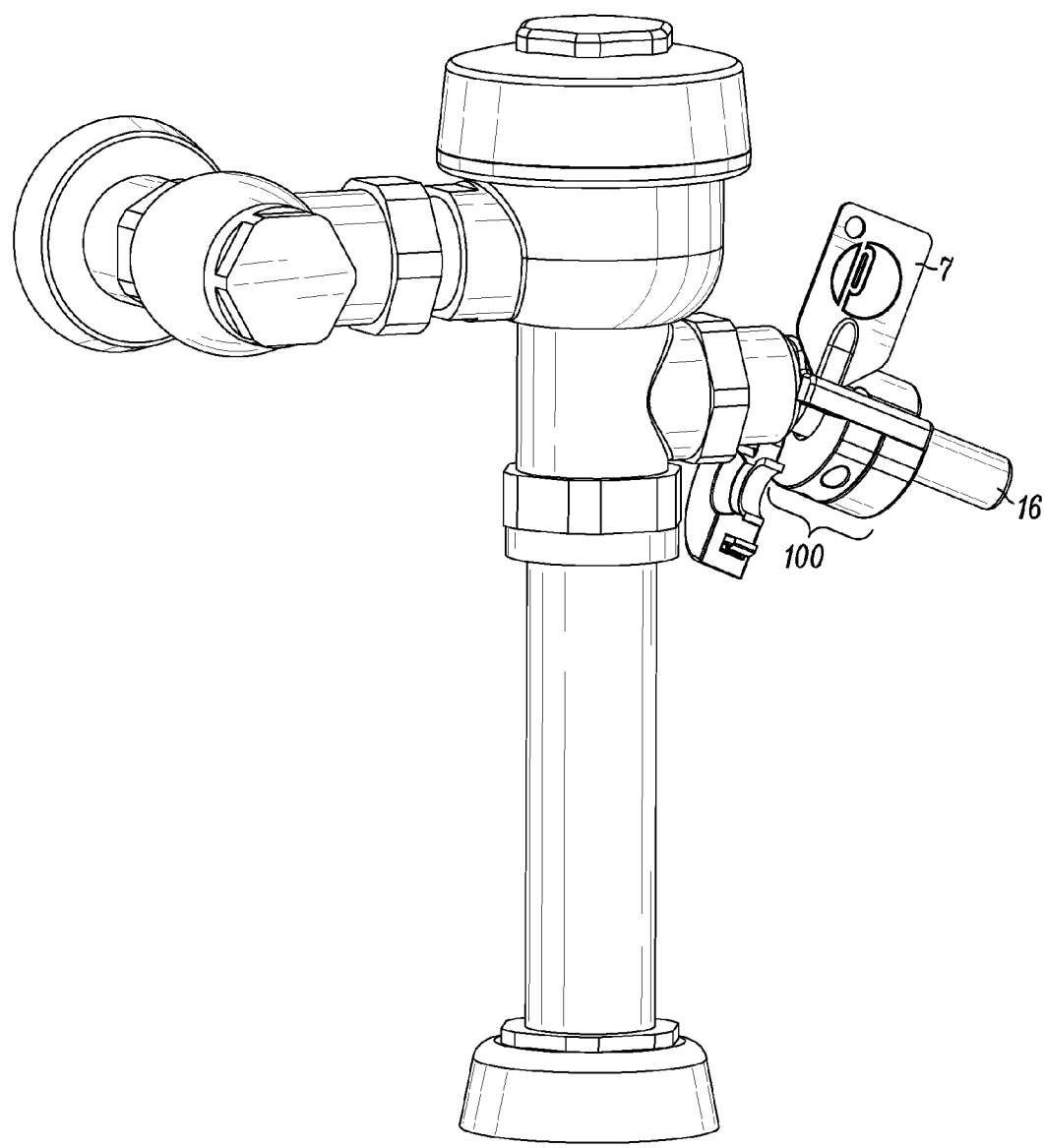
FIG. 10 is a front view of a handle lock assembly secured to a right handle installation with the release key inserted into the receiving slot or aperture in the top component, the first arm section in the open position, and the handle in a down position, indicating the handle has been flushed.

FIGS. 9-10 are representative schematics of the handle lock assembly 100 on a right handle assembly with the release key 7 inserted into the receiving slot in the top component 3. The first arm section 4 is in the down position, indicating that the handle is ready to flush. As shown in FIG. 10, when the release key 7 is engaged, the arm is released, thereby allowing the right handle 16 to move downward and flush. In some embodiments, release key 7 will be removed after releasing first arm section 4 and prior to flushing. Release key 7 does not need to remain engaged in order to flush once first arm section 4 is in the down position.

Figure 11:
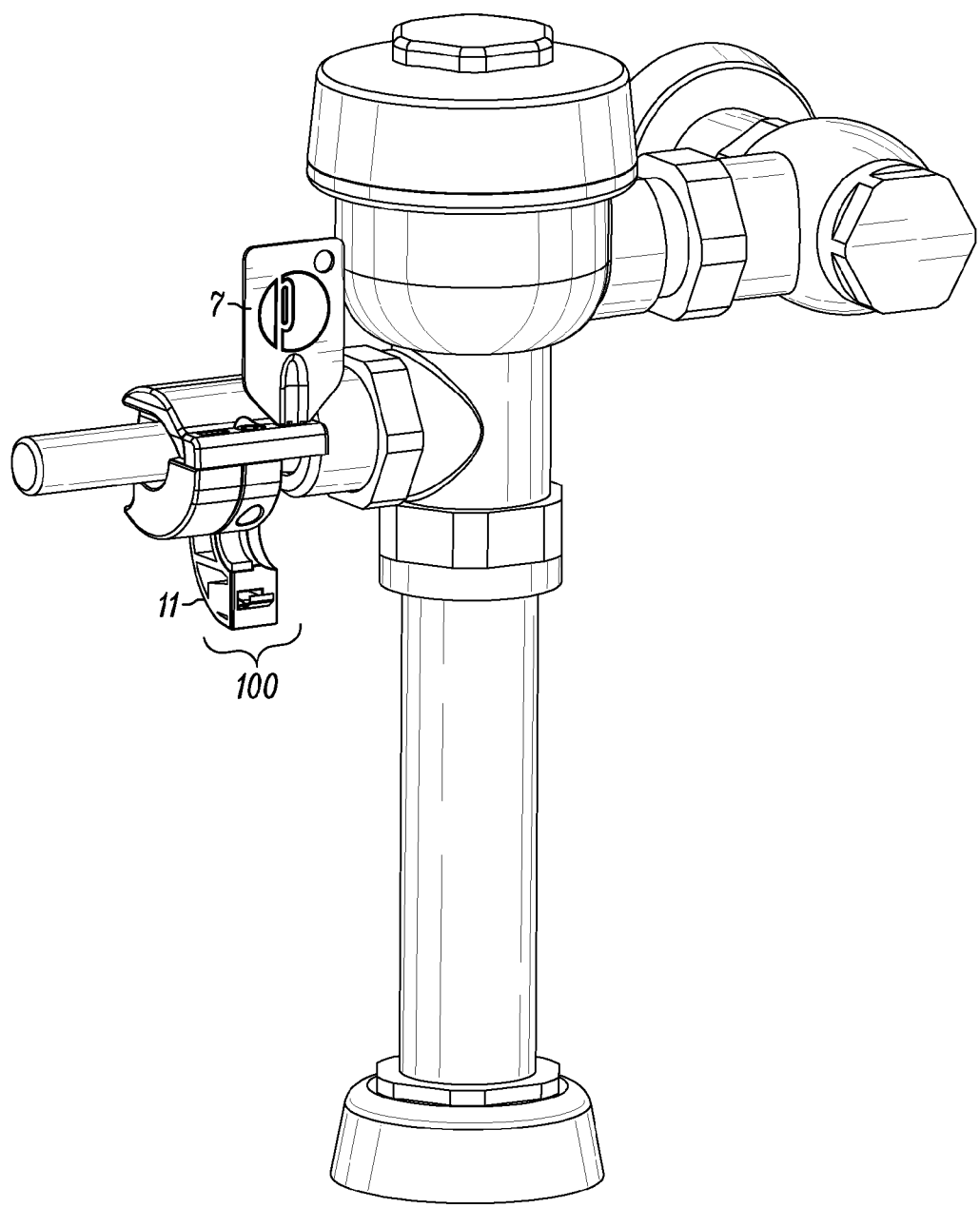
FIG. 11 is a front view of a handle lock assembly secured to a left handle installation with the release key inserted into the receiving slot or aperture in the top component and the second arm section in the open position.
Figure 12:
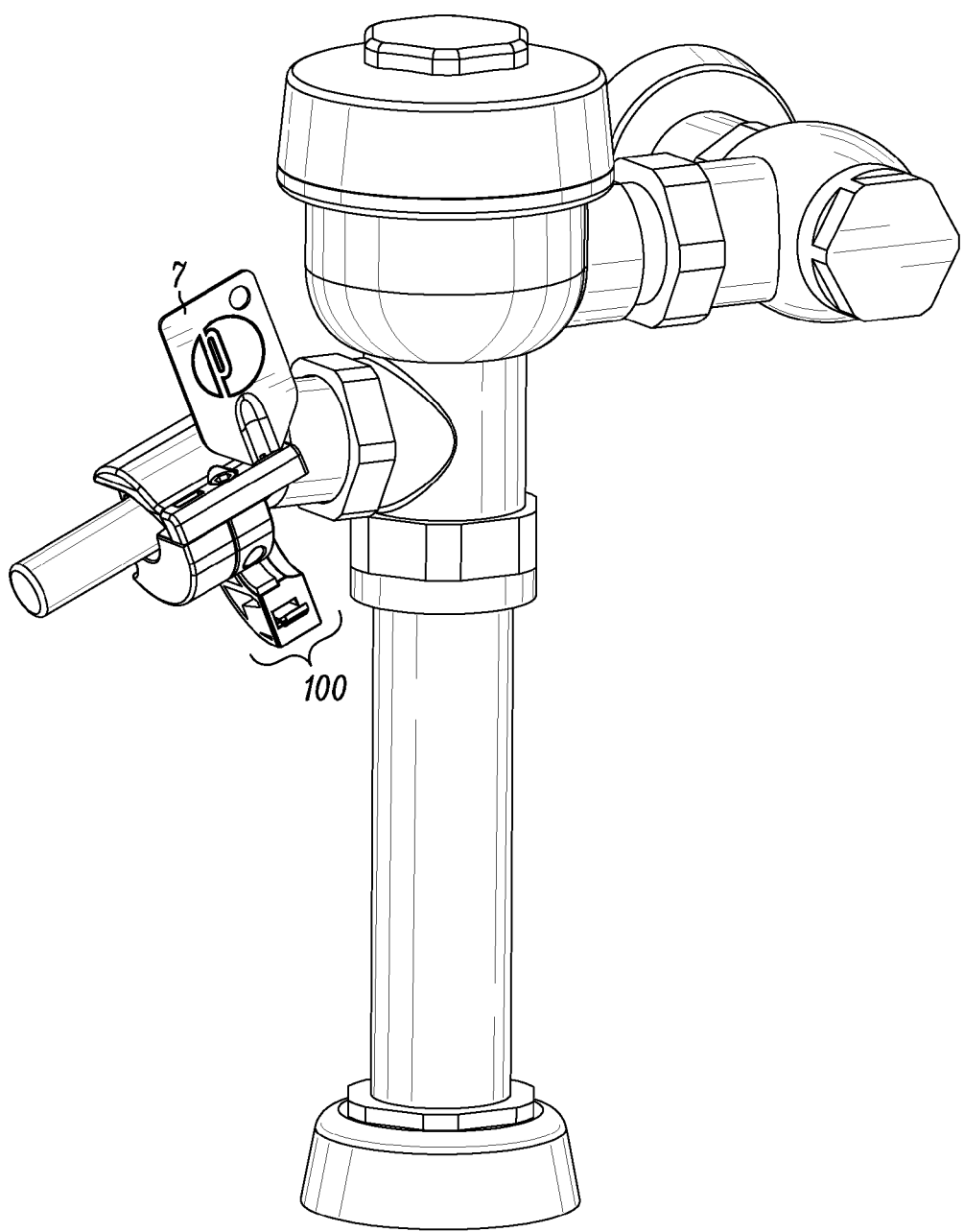
FIG. 12 is front view of a handle lock assembly secured to a left handle installation with the release key inserted into the receiving slot or aperture in the top component, the second arm section in the open position, and the handle in a down position, indicating the handle has been flushed.
Figure 13:
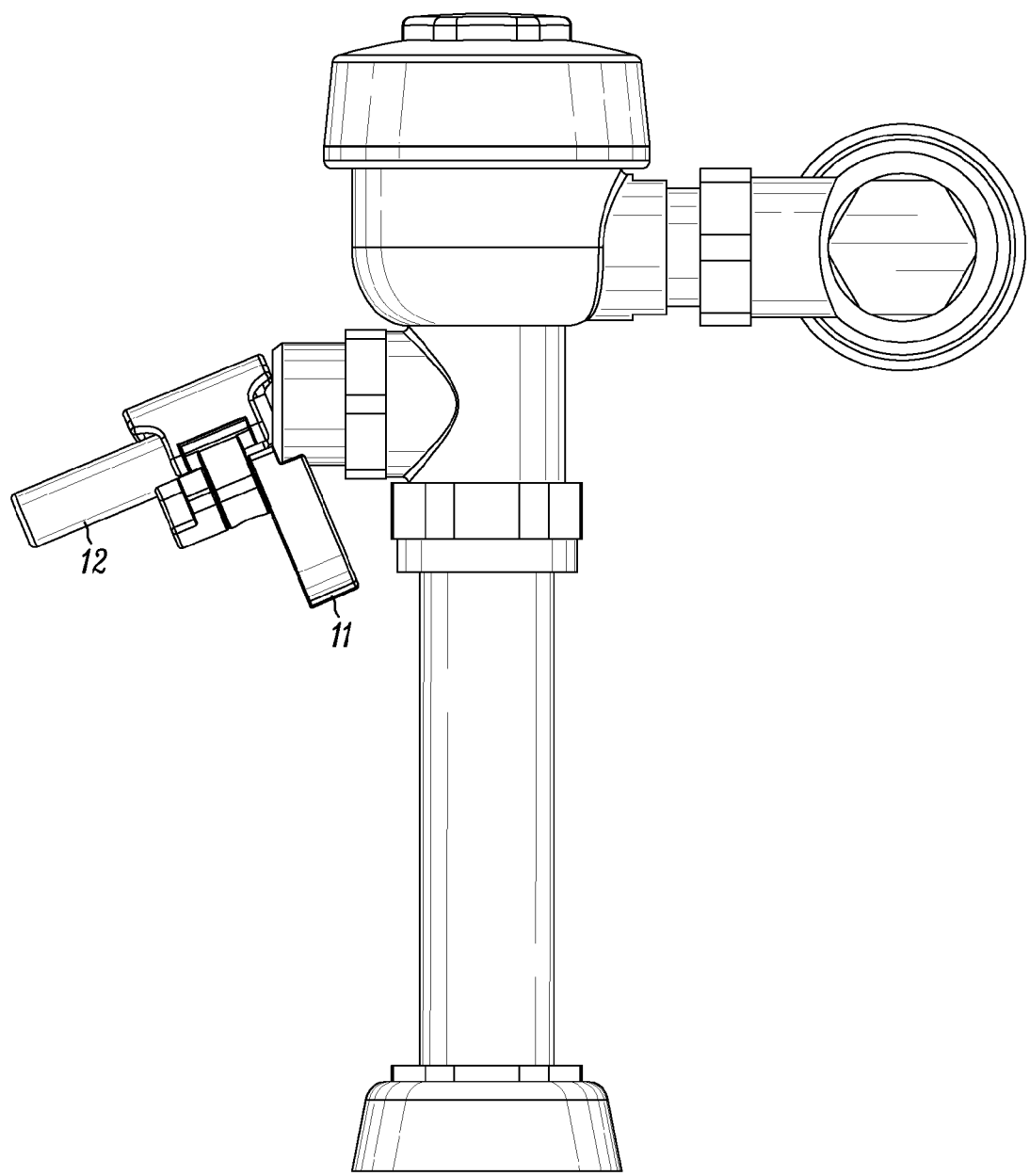
FIG. 13 is a back view of a handle lock assembly secured to a right handle installation with the second arm section in the open position, and the handle in a down position, indicating the handle has been flushed.

FIGS. 11-13 are representative schematics of the handle lock assembly 100 on a left handle assembly with the release key 7 inserted into the receiving slot in the top component 3. The second arm section 5 is in the down position, indicating that the handle is ready to flush. As shown in FIGS. 12-13, when the release key 7 is engaged, the arm is released, thereby allowing the left handle 15 to move downward and flush. As mentioned above, however, release key 7 does not need to remain engaged after second arm section 5 is in the down position. Once the second arm section 5 is in the down position, release key 7 may be removed and the handle will be ready to flush without the release key 7 engaged.

FIG. 13 depicts a left handle installation. The release key 7 has been inserted so the second arm 5 section is in the down position, and the left handle 12 is in a down position, indicating the handle has been flushed.

Figure 14:
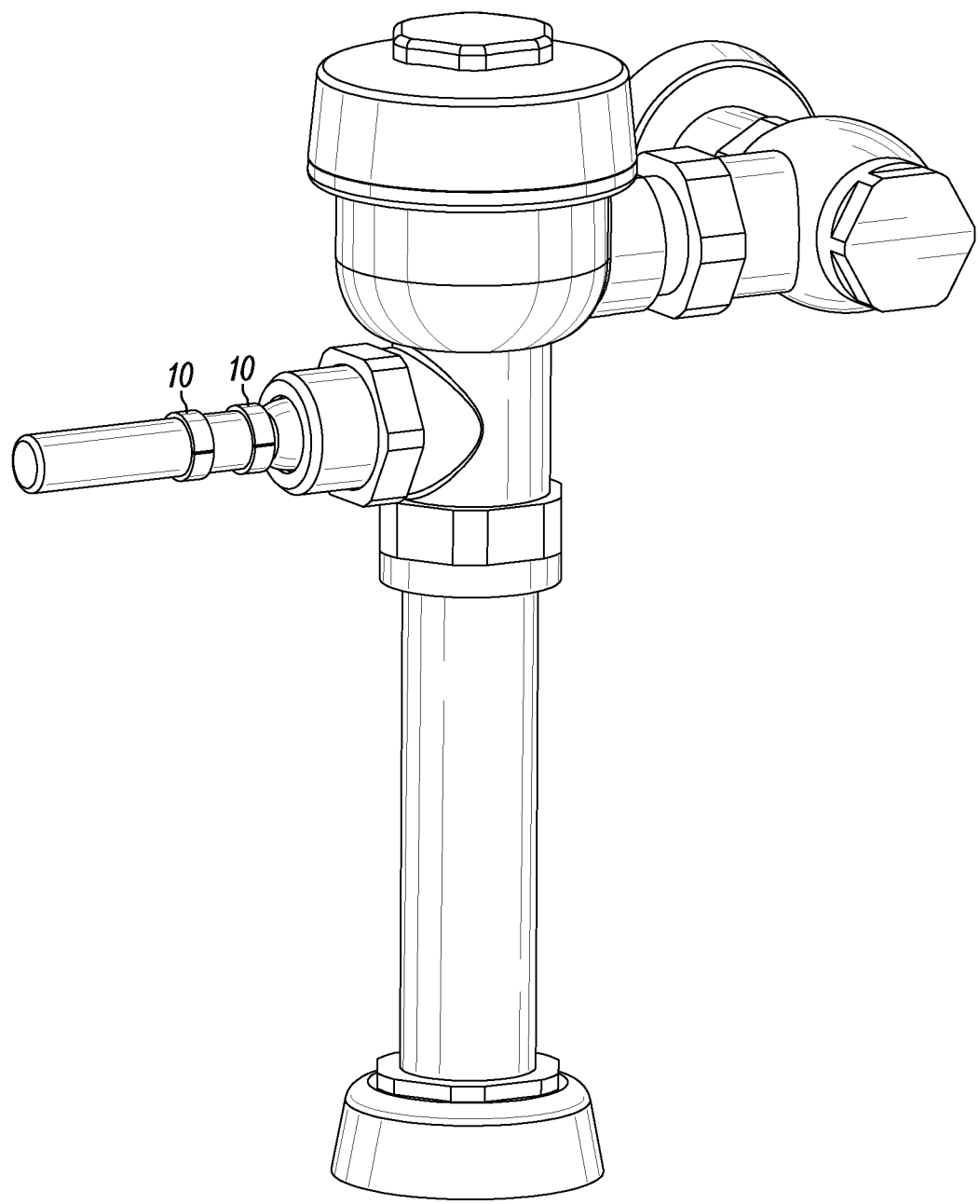
FIG. 14 is a front view of the left hand installation showing rubber shims on a handle. The rubber shims can be used to secure the handle lock assembly to the handle.

As shown in FIG. 14, rubber shims 10 can be used to secure the handle lock assembly 100 to any type of handle and any size of handle. Any number of rubber shims can be used to secure the handle lock assembly including but not limited to 2, 3, 4, 5, 6, 7, 8, 9, 10, and greater than 10. One of ordinary skill in the art will understand that the rubber shims can be of any size and thickness. If the handle lock assembly 100 is going to be secured to a thinner handle, more rubber shims may be needed to securely attach the handle lock assembly 100. Conversely, with a thicker or bulkier handle, less rubber shims may be needed to secure the handle assembly to the handle.

In the embodiments described above, handle lock assembly 100 has been described as secured to a lever-type flush actuator; however, in further embodiments, the flush actuator may be any style actuator used on a urinal, toilet or other fixture, including, but not limited to, push buttons. In some embodiments, such as when used with a push button style actuator, the handle lock assembly 100 may include only a single pivoting arm section.

Method of Conserving Water

In one embodiment, the disclosure relates to a method of conserving water. In one embodiment, the method comprises placing a handle lock assembly on a handle of a urinal or toilet, wherein the handle lock assembly prevents flushing if a release key has not been inserted into the assembly. Thus, the handle lock assembly provides for control over when flushing occurs, and provides for the reduction in the number of flushes for a particular installation over a period of time. The handle lock assembly can reduce water usage from 1 to 5% or from 5 to 10% or from 10 to 20% or from 20 to 30% or from 30 to 40% or from 40 to 50% or from 50 to 60% or from 60 to 70% or from 70 to 80% or from 80 to 90% or from 90 to 95% or from 95 to 100% or from 100 to 200% and greater than a 200% reduction in water usage.

It is specifically intended that the present disclosure not be limited to the embodiments and illustrations contained herein, but include modified forms of those embodiments including portions of the embodiments and combinations of elements of different embodiments as come within the scope of the following claim.

We claim:

1. A flush actuator lock assembly configured for placement on a flush actuator of a fixture, the actuator lock assembly comprising:

A. A top component having a first end, a second end, and a key receiving aperture, B. A bottom component comprising a first arm section pivotally connected to the first end of the top component and a locking element for releasably locking with a mating locking element on the second end of the top component, a second arm section pivotally connected to the first end of the top component, and a center support section situated between the first and second arm sections, wherein a key structure inserted into the key receiving aperture disengages the locking elements of the top component and the arm, allowing the arm to pivot.

2. A handle lock assembly configured for placement on a handle of a urinal or toilet, the handle lock assembly comprising:

A. A top component having an arcuate inner surface and first and second ends,

B. A bottom component comprising first and second arm sections and a center support section situated there between, each of said sections having an arcuate inner surface and first and second ends, each of the first ends being pivotally connected to the first end of the top component, the second end of the center support section being rigidly connected to the second end of the top component, and each of the second ends of the arm sections comprising a locking element for releasably locking with a mating locking element on the second end of the top component.

3. The handle assembly of claim 2, wherein the second end of the top component has two spaced apart apertures, each aperture configured for releasably engaging a lock spring.

4. The handle lock assembly of claim 3, wherein the locking elements of the arm sections comprise a lock spring configured for insertion into and releasable engagement within the aperture in the second end of the top component.

5. The handle lock assembly of claim 4, wherein a release key is configured for insertion into the apertures in the top component to disengage the lock spring.

6. The handle lock assembly of claim 2, further comprising one or more shims sized for placement in contact with the inner surface of an arm section.

7. The handle lock assembly of claim 2, wherein the handle lock assembly can be secured to a right or left handle installation.

8. A handle lock assembly configured for placement on a handle of a urinal, the handle lock assembly comprising:

A. A top component having an arcuate inner surface and first and second ends, the second end having two spaced apart apertures, each aperture configured for releasably engaging a lock spring therein;

B. A bottom component comprising first and second arm sections and a center support section situated there between, each of said sections having an arcuate inner surface and first and second ends, each of the first ends being pivotally affixed to the first end of the top component, the second end of the center support section being rigidly affixed to the second end of the top component, and each of the second ends of the arm sections comprising a lock spring configured for insertion into and releasable engagement within one of the apertures in the top component.

9. The handle lock assembly of claim 8, wherein a release key is configured for insertion into the apertures in the top component to disengage the lock spring.

10. The handle lock assembly of claim 8, further comprising one or more shims sized for placement in contact with the inner surface of an arm section.

11. The handle lock assembly of claim 8, wherein the handle lock assembly can be secured to a right or left handle installation.

12. A urinal or toilet comprising:

a flush valve having a body with a handle projecting from the body, the handle having a first end attached to the flush valve body and a second end distal from the flush valve body; the handle being moveable from a seated position to an unseated position to flush the urinal or toilet; and a handle lock assembly mounted onto and encircling the handle, the handle lock assembly comprising:

a top component and a bottom component having an arcuate inner surface, the bottom component comprising first and second arm sections and a center support section situated there between;

the top component having a first end pivotally connected to first ends of each of the sections of the bottom component, and a second end;

the center support section having a second end rigidly connected to the second end of the top component, the first and second arm sections having second ends comprising a locking element releasably locked with a mating locking element on the second end of the top component; and the first arm section positioned proximal to the first end of the handle;

wherein when the locking element of the first arm section is locked with the mating locking element on the top component, the handle cannot be moved from the seated position, and when the locking element of the first arm section is unlocked and the first arm section is pivoted downwardly, the handle is moveable from the seated to the unseated position.

13. The urinal or toilet of claim 12, wherein the second end of the top component has two spaced apart apertures, each aperture configured for releasably engaging a lock spring.

14. The urinal or toilet of claim 13 wherein the handle lock assembly further comprises a release key configured for insertion into the apertures in the top component to disengage the lock spring.

15. The urinal or toilet of claim 12, further comprising one or more shims sized for placement in contact with the inner surface of an arm section.

16. The urinal or toilet of claim 12, wherein the handle lock assembly can be secured to a right or left handle installation.

* * * * *